Dec. 10, 1946.  J. A. COOK  2,412,205
PONTOON METERING VALVE AND COMBINATION
Filed May 12, 1945  2 Sheets-Sheet 1
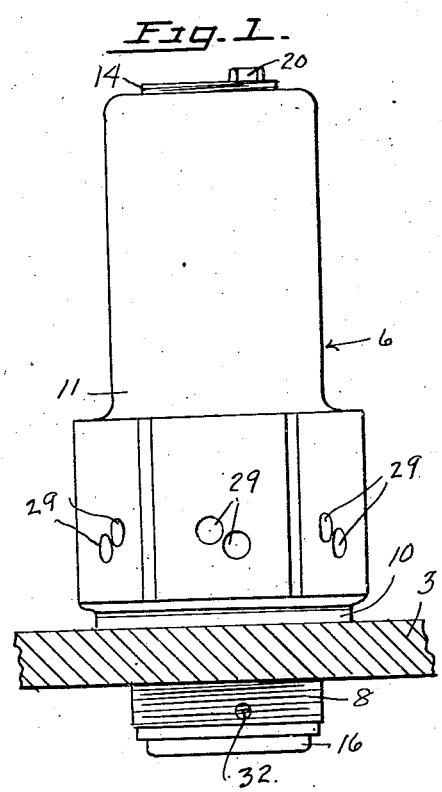
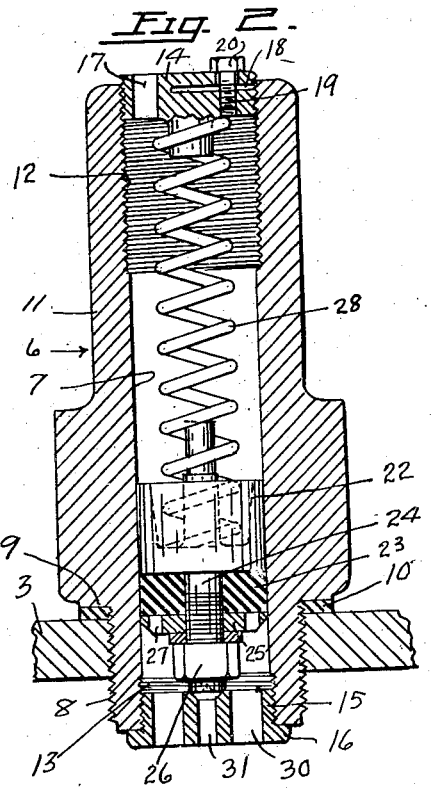
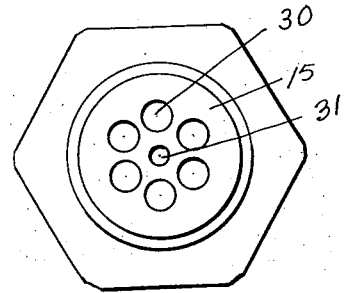
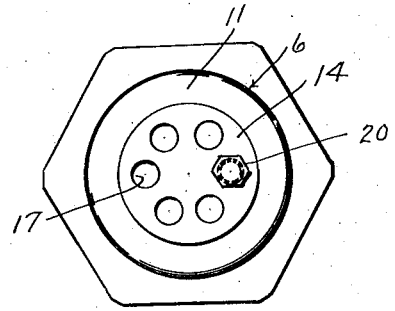
INVENTOR.
JOHN A. COOK
BY
Bosher, Mohler & Beckley
ATTORNEYS.

Dec. 10, 1946.  J. A. COOK  2,412,205
PONTOON METERING VALVE AND COMBINATION
Filed May 12, 1945  2 Sheets-Sheet 2

INVENTOR.
JOHN A. COOK
BY
Boyken, Mohler & Beekle,
ATTORNEYS.

Patented Dec. 10, 1946

2,412,205

UNITED STATES PATENT OFFICE 2,412,205

PONTOON METERING VALVE AND COMBINATION

John A. Cook, San Francisco, Calif.

Application May 12, 1945, Serial No. 593,416

8 Claims. (Cl. 114—54)

This invention relates to a pontoon metering valve and to such valve in combination with a salvage pontoon.

In my co-pending application Serial No. 500,371, filed August 17, 1943, which is directed toward a collapsible salvage pontoon, the presence of adjustable relief valves is indicated and described. In the use of pontoons, whether collapsible or rigid, the accurate control of the internal pressure in the gas within the pontoon at any depth is highly desirable, if not absolutely essential in some instances. For example, it may be that an internal pressure, say of 108 lbs. per square inch, may be necessary to produce the desired lift and as there is a substantial variation in the external pressure of the water in which the pontoon is submerged as the depth increases or decreases and which variations are directly reflected on the air pressure within the pontoon where the latter is collapsible, the desired control is quite difficult. One of the main objects of this invention is the provision of a relief or metering valve that will be accurate and reliable in maintaining a predetermined desired internal pressure in the pontoon at any depth in excess of the external pressure and another object of the invention is the provision of a pontoon in combination with one or more of such valves.

In the drawings,

Fig. 1 is an elevational view of a metering valve of this invention, a portion of the pontoon being in section.

Fig. 2 is a vertical sectional view through the valve of Fig. 1, certain internal parts being shown in elevation.

Fig. 3 is a bottom plan view of the valve of Fig. 1.

Fig. 4 is a top plan view of the valve of Fig. 1.

Figure 5:
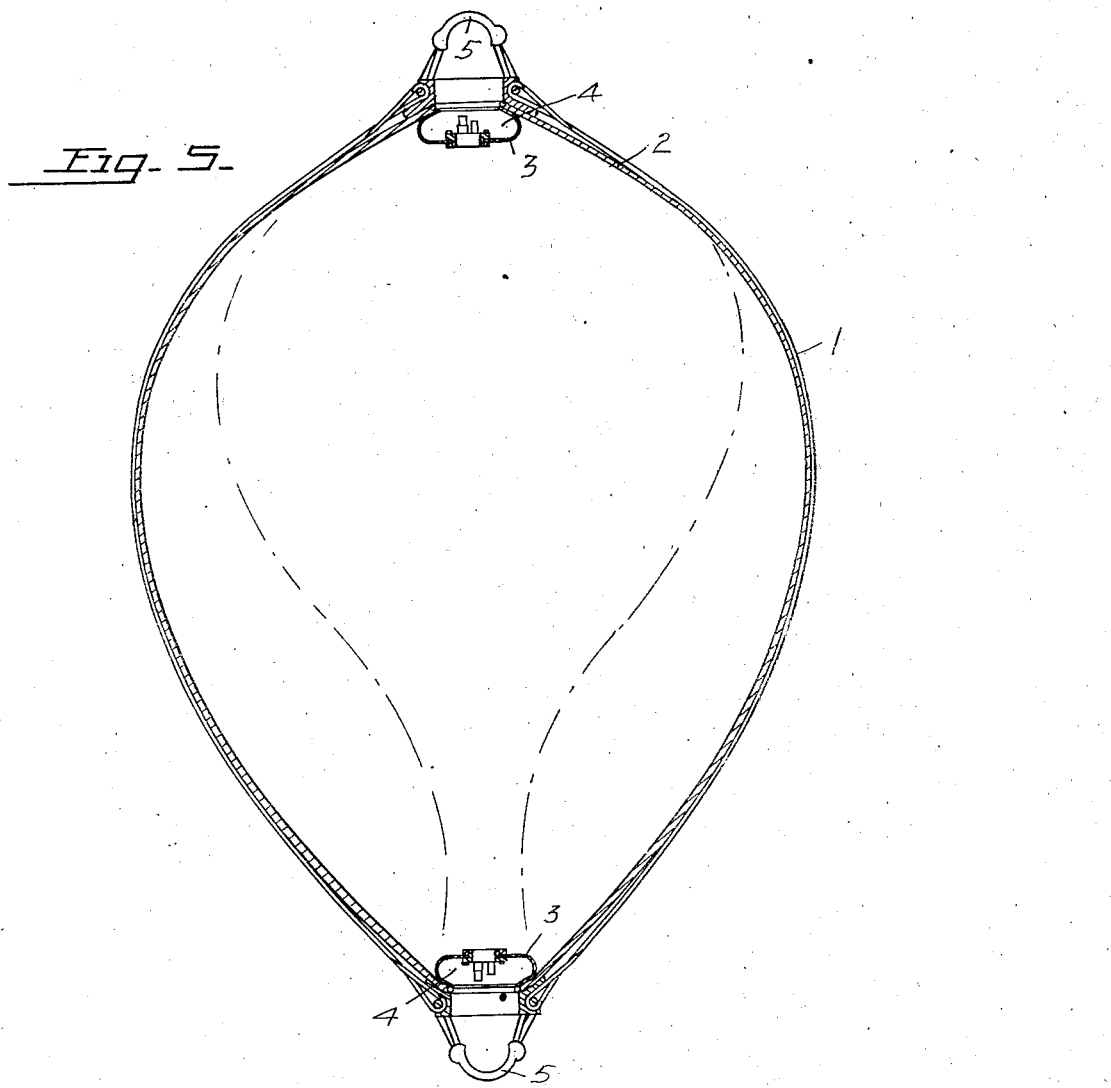
Fig. 5 is a semi-diagrammatic view of a collapsible pontoon showing a metering valve at the top and bottom ends of the pontoon.

In detail referring to Fig. 5 the pontoon thereof is preferably of the same structure as that shown in my said co-pending application in that it has a flexible outer covering or cage of woven cables or wires 1 and a fluid proof relatively heavy collapsible liner 2 within said cage. There is a valve carrying head 3 at the upper and at the lower end of the pontoon, each head being formed with an outwardly opening recess 4 in which the outer ends with outwardly projecting ends of the valves project so as to protect the valves without making them inaccessible. Any desired type of sling or loop 5 may be at opposite ends of the pontoon for securing the latter to the object to be lifted. The cage and liner may be secured to the heads in a manner whereby the lifting force of the liner will be transmitted to the cage which in turn transmits the force to the object to be lifted. Hence there is no detrimental strain on the liner.

One of the valves carried by each head 3 is what I have termed a metering valve, which valve is more fully illustrated in Figs. 1 to 4. The function of this valve is to prevent the internal pressure from rising above a predetermined number of pounds per square inch in excess of the water pressure outside the pontoon.

The valve of Figs. 1 to 4 comprises a tubular elongated valve casing 6 formed with a cylindrical straight through bore 7 of uniform diameter.

The exterior of one end of said casing (bottom end in Figs. 1, 2) may be threaded, as at 8, for threadedly securing said end in an interiorly threaded opening in head 3 and a shoulder 9 adjacent said end provides for seating of a seating gasket or washer 10 between the shoulder and head for forming a tight fluid tight seal.

The remainder 11 of said casing projects outwardly of the interior of the pontoon and into recess 4 in each head. Thus the inner end of the casing communicates with the interior of the pontoon and the remainder 11 communicates with the water outside the pontoon where the pontoon is submerged.

The outer end of bore 7 that is in said remainder 11 is formed with threads 12 while the inner or opposite end of bore 7 is formed with threads 13.

An exteriorly threaded member 14 is positioned within said outer end of bore 7 in threaded engagement with the threads 12, while an exteriorly threaded member 15 is within the inner end of said bore in threaded engagement with threads 13 and said latter member has a radialy projecting flange 16 (Fig. 2) that engages the inner end of the casing 6 thereby fixedly positioning the member 15 with respect to the casing. Member 14, however, may be screwed to various distances within bore 7.

The member 14 is preferably formed with a circular row of apertures 17 which apertures are equally spaced from the central axis of the member. Member 14 is also cut at 18 (Fig. 2) about halfway through in the plane of the member and transversely of the axis and a lock screw 19 extending axially of the member also extends across the said cut and is threadedly engaged in the portion of the member that is nearest the member 15 while the head 20 of said screw reacts against the position at the opposite outer side of the cut. Thus upon tightening the screw 18 from outside the casing the same will lock the threads of the member to threads 12 so as to prevent accidental loosening of member 14.

Within bore 7 is a piston 22 reciprocable in said bore, said piston having an expansible sealing disk 23 disposed against the side of the same nearest member 15. The head of said piston may carry an axially projecting post 24 extending through a central aperture in said disk and through a circular retaining plate 25 that is threaded on said post. A nut 26 also threadedly secured on post 24 outwardly of plate 25 cooperates with said plate to securely hold the latter in adjusted position on said post. Holes or recesses 27 in plate 25 may be engaged by a spanner wrench for adjusting the plate on post 23. Upon tightening the plate against disk 23 the latter will expand radially to form a fluid tight seal between the walls of bore 7 and the disk.

Extending between piston 22 and member 14 is a coil spring 28 that yieldably holds the piston in a predetermined position, preferably closely adjacent, if not in actual engagement with, the member 15, it being understood that the projection 24 engages member 15, said projection being a part of the piston.

The casing itself is formed with a plurality of pairs of adjacent openings 29 (Fig. 1) which pairs of openings are equally spaced from an end of the casing although the openings of each pair are preferably so arranged that one is slightly nearer said end than the other. This spacing of the openings of each pair is such that movement of the piston toward member 14 from a position in which the piston covers the holes will result in a progressive increase in the effective opening in which the two openings of each pair are uncovered.

The normal position of the piston at equal pressure on both sides is such that the piston extends across the pairs of openings 29. Thus when the casing is submerged in water no impurities can enter the valve through said openings.

The end member 15 is formed with a plurality of openings 30 the total area of which may be slightly less than the total area of openings 29 and there may also be a central opening 31 in member 15 to permit access to the end of post 24 that normally extends across said opening 31 to permit a measuring instrument to engage said post for "setting" the desired tension on spring 28. By engaging such post by any conventional pressure gauge and then moving member 14 toward or away from such gauge, the pounds pressure required to displace the piston and to overcome the tension of the spring is readily determined.

A set screw 32 (Fig. 1) may be provided, if desired, to insure against loosening of the member 15.

The foregoing arrangement is such that the opposite end areas on the piston (which includes disk 23 and all parts secured to piston 17) that is presented to fluid pressure within bore 7 and entering such bore are equal and this equality remains the same at all positions of the piston within the said bore. This is very important.

In actual practice, assuming the pontoon is lowered in several hundred feet of water and it is desired that the air pressure within the pontoon remain at approximately 8 lbs. per square inch in excess of the external water pressure, the spring 28 will be tensioned to permit movement of the piston past openings 29 to uncover the latter only when the air pressure within the pontoon and reacting against the piston through openings 30, 31 equals the liquid pressure per square inch against the opposite end of the piston plus said eight pounds. Thus at no matter what depth the pontoon may be lowered, the internal pressure in excess of external pressure will remain constant, it being understood, of course, that the pontoon is deflated or substantially so until it is attached to the part to be raised.

Metering valves are at both ends of the pontoon as the pontoons may change position during an operation or they may be horizontal or air may reach only one valve of the pair. Where the pontoon is vertical and substantially fully inflated with air operative on both valves at both ends there is a considerable differential in the external pressure at opposite ends, assuming the vertical dimension of the pontoon to be about 17 or 18 feet which is about the normal vertical dimension of a standard sized pontoon. In such instance the external pressure at the lower end of the pontoon would be about eight pounds greater than at the upper end of the pontoon. Thus the tension of the spring in the valve at the lower end would be decreased so that the valve would open under the same internal pressure as the top valve where the external pressure of water resisting such opening is less. By this arrangement any sudden upward movement of the pontoon that might be disastrous unless the internal pressure is quickly released would be avoided as both valves would open at the same time. If the spring were set to the same tension, such simultaneous release would not be possible.

The equal areas presented by opposite ends of the piston to fluid in the bore of the valve are very important to the desired regulation of pressure irrespective of whether or not the pontoon is collapsible or rigid.

It is to be noted that the flexible pontoons of this invention ordinarily are not fully inflated, and when vertical it is not common for the air to reach the lower valve. When the pontoons are used within a ship below the main or sub deck they may in most instances be horizontal or perhaps tilted, and in some instances where a ship is rolled over the pontoons may be completely inverted. Thus the provision of the relief or metering valves at opposite ends of each pontoon is quite important.

I claim:

1. In combination with a flexible salvage pontoon, a metering valve carried by said pontoon comprising a tubular casing having a through bore extending longitudinally thereof communicating at one end with the interior of said pontoon and at its opposite end with the exterior, a discharge port in a side of said casing outside said pontoon communicating with said bore at a point intermediate the ends of the latter, a piston reciprocable in said bore presenting equal area axially facing end surfaces to the pressure influence of fluid in opposite ends of said bore, a spring in said casing reacting against the end of said piston adjacent the end of the bore communicating with the exterior of said pontoon for yieldably holding said piston in a position closing said port at said point and yieldably resisting movement of said piston against outward movement in said casing relative to the interior of said pontoon, said piston being movable under gas pressure in said pontoon to a position uncovering said port, and means for regulating the tension of said spring against said piston.

2. In combination with a flexible salvage pontoon, a metering valve carried by said pontoon comprising a tubular casing having a through bore extending longitudinally thereof communicating at one end with the interior of said pontoon and at its opposite end with the exterior, a discharge port in a side of said casing outside said pontoon communicating with said bore at a point intermediate the ends of the latter, a piston reciprocable in said bore presenting equal area axially facing end surfaces to the pressure influence of fluid in opposite ends of said bore, a spring in said casing reacting against the end of said piston adjacent the end of the bore communicating with the exterior of said pontoon for yieldably holding said piston in a position closing said port at said point and yieldably resisting movement of said piston against outward movement in said casing relative to the interior of said pontoon, said piston being movable under gas pressure in said pontoon to a position uncovering said port, and means for regulating the tension of said spring against said piston, liquid sealing means carried by said piston and positioned between said point in said bore and the end of the bore communicating with the interior of said pontoon when equal pressures are against opposite ends of said piston.

3. In combination with a flexible salvage pontoon, a metering valve carried by said pontoon comprising a tubular casing having a through bore extending longitudinally thereof communicating at one end with the interior of said pontoon and at its opposite end with the exterior, a discharge port in a side of said casing outside said pontoon communicating with said bore at a point intermediate the ends of the latter, a piston reciprocable in said bore presenting equal area axially facing end surfaces to the pressure influence of fluid in opposite ends of said bore, a spring in said casing reacting against the end of said piston adjacent the end of the bore communicating with the exterior of said pontoon for yieldably holding said piston in a position closing said port at said point and yieldably resisting movement of said piston against outward movement in said casing relative to the interior of said pontoon, said piston being movable under gas pressure in said pontoon to a position uncovering said port, and means for regulating the tension of said spring against said piston, said bore being of uniform diameter from end to end thereof, and apertured end members secured in opposite ends of the said bore.

4. In combination with a flexible salvage pontoon, a metering valve carried by said pontoon comprising a tubular casing having a through bore extending longitudinally thereof communicating at one end with the interior of said pontoon and at its opposite end with the exterior, a discharge port in a side of said casing outside said pontoon communicating with said bore at a point intermediate the ends of the latter, a piston reciprocable in said bore presenting equal area axially facing end surfaces to the pressure influence of fluid in opposite ends of said bore, a spring in said casing reacting against the end of said piston adjacent the end of the bore communicating with the exterior of said pontoon for yieldably holding said piston in a position closing said port at said point and yieldably resisting movement of said piston against outward movement in said casing relative to the interior of said pontoon, said piston being movable under gas pressure in said pontoon to a position uncovering said port, and means for regulating the tension of said spring against said piston, liquid sealing means carried by said piston and positioned between said point in said bore and the end of the bore communicating with the interior of said pontoon when equal pressures are against opposite ends of said piston, apertured end means respectively secured in opposite ends of said bore respectively engaged by said piston and by said spring.

5. A metering valve for a salvage pontoon comprising an elongated tubular body formed with a through bore of uniform diameter extending longitudinally thereof, an apertured member secured in each end of said bore, a piston floatingly mounted in said bore for reciprocation therein and presenting equal area axially facing end surfaces to the pressure influence of fluid adapted to enter the ends of said bore through the apertures in said end members respectively, a spring yieldably urging said piston to a position in one end of said bore into engagement with the member in said end, a port in one side of said body opening into said bore at a point against a side of said piston whereby said piston will normally close said port, and means for securing said body to a pontoon with the end adjacent said piston communicating with the interior of such pontoon and with the opposite end communicating with the exterior of such pontoon, means for regulating the tension of said spring against said piston, and means carried by said piston for forming a fluid tight seal between the ends of said bore.

6. A metering valve for a salvage pontoon comprising an elongated tubular body formed with a through bore of uniform diameter extending longitudinally thereof, an apertured member secured in each end of said bore, a piston floatingly mounted in said bore for reciprocation therein and presenting equal area axially facing end surfaces to the pressure influence of fluid adapted to enter the ends of said bore through the apertures in said end members respectively, a spring yieldably urging said piston to a position in one end of said bore into engagement with the member in said end, a port in one side of said body opening into said bore at a point against a side of said piston whereby said piston will normally close said port, and means for securing said body to a pontoon with the end adjacent said piston communicating with the interior of such pontoon and with the opposite end communicating with the exterior of such pontoon, means for regulating the tension of said spring against said piston, and means carried by said piston for forming a fluid tight seal between the ends of said bore, said means comprising a compressible and radially expansible washer at the end of said piston opposite said spring, and movable means for so expanding said washer.

7. In a flexible salvage pontoon, a metering valve comprising a tubular casing having a through bore extending longitudinally thereof, means for securing said valve to a wall of such pontoon with one end of said bore communicating with the interior of said pontoon and with its opposite end communicating with the exterior of said pontoon, a discharge port in a side of said casing that is adapted to be positioned outwardly of said pontoon communicating with said bore at a point intermediate the ends of the latter, a piston reciprocable in said bore presenting fully exposed equal area axially facing end surfaces to the pressure influence of fluid in opposite ends of said bore, a spring in said casing reaching against the end of said piston adjacent the said opposite end for yieldably holding said piston in a position closing said port at said point and for yieldably resisting movement of said piston against outward movement in said casing relative to the interior of such pontoon when the said valve is secured to said wall, said piston being movable under gas pressure in such position to a position uncovering said port, and means for regulating the tension of said spring against said piston.

8. A flexible salvage pontoon for containing gas under pressure and for use under water, a wall of which is provided with movable means automatically responsive to variations in internal air pressure and external water pressure relatively for releasing gas from said pontoon at any time the difference between said internal gas pressure and the external water pressure exceeds a predetermined amount.

JOHN A. COOK.